(12) United States Patent
Preti et al.

(10) Patent No.: US 8,191,948 B2
(45) Date of Patent: Jun. 5, 2012

(54) GRIPPER FOR CONTAINERS

(75) Inventors: Fabrizio Preti, Noceto (IT);
Massimiliano Barbieri, Corcagnano (IT)

(73) Assignee: Sidel Holdings & Technology S.A., Pully (CH)

( * ) Notice: Subject to any disclaimer, the term of this patent is extended or adjusted under 35 U.S.C. 154(b) by 545 days.

(21) Appl. No.: 12/302,916

(22) PCT Filed: May 30, 2007

(86) PCT No.: PCT/EP2007/055244
§ 371 (c)(1),
(2), (4) Date: Feb. 6, 2009

(87) PCT Pub. No.: WO2007/144262
PCT Pub. Date: Dec. 21, 2007

(65) Prior Publication Data
US 2010/0289287 A1  Nov. 18, 2010

(30) Foreign Application Priority Data
Jun. 14, 2006  (EP) .................................. 06425399

(51) Int. Cl.
*B25J 15/00* (2006.01)
*B67C 3/24* (2006.01)
*B65G 47/90* (2006.01)

(52) U.S. Cl. ...................................... 294/116; 294/106

(58) Field of Classification Search .................. 294/106, 294/116, 110.1; 198/803.7, 803.9
See application file for complete search history.

(56) References Cited

U.S. PATENT DOCUMENTS

| | | | | |
|---|---|---|---|---|
| 2,449,559 | A * | 9/1948 | Lundeen | 294/90 |
| 2,722,450 | A * | 11/1955 | Nelson | 294/90 |
| 3,937,514 | A * | 2/1976 | Langowski | 294/88 |
| 4,709,803 | A * | 12/1987 | Swiderski | 198/468.2 |
| 5,253,910 | A * | 10/1993 | Perrier | 294/116 |
| 5,388,820 | A * | 2/1995 | Eberle et al. | 271/277 |
| 5,575,379 | A * | 11/1996 | Schmetzer | 198/803.9 |
| 7,661,739 | B2 * | 2/2010 | Burgmeier | 294/106 |
| 8,002,106 | B2 * | 8/2011 | Preti et al. | 198/459.2 |

FOREIGN PATENT DOCUMENTS

| | | |
|---|---|---|
| DE | 10140315 | 3/2003 |
| EP | 0005402 | 11/1979 |
| EP | 0486439 | 5/1992 |
| WO | 03/078285 | 9/2003 |

* cited by examiner

*Primary Examiner* — Paul T Chin
(74) *Attorney, Agent, or Firm* — Shoemaker and Mattare

(57) ABSTRACT

A gripper for manipulating containers includes a support on which a cam mechanism is pivotally mounted. The gripper has a first jaw operated by the cam mechanism and a second jaw controlled by the first jaw. The first jaw has an actuator which interacts with a receiving mechanism on the second jaw for opening or closing the gripper. The actuator is pivotally associated with the first jaw so that, when force is applied by the receiving mechanism due to rotation of the second jaw relative to the first jaw, the actuator can rotate relative to the first jaw to allow the gripper to open.

9 Claims, 5 Drawing Sheets

GRIPPER FOR CONTAINERS

FIELD OF THE INVENTION

The present invention relates to a gripper for containers of the type used in systems for manipulating containers (particularly bottles), in filling plants.

BACKGROUND ART

Both linear and rotary filling plants are known to comprise a plurality of serially arranged operating units for the bottles to be moved therethrough. Plastic (PET) bottles, particularly, are moved by being hooked at the neck by means of suitable grippers that are usually made of steel or resistant plastic. These grippers are controlled by suitable cams, which provide to close them around a bottle neck in the gripping stations, and then hold the same in this condition throughout the pathway to the release station.

The bottles, however, sometimes happen to be entangled in parts of the machine. In this event, though becoming deformed, they do not break, and thus act as levers on the gripper that is locked by the cam in a closed condition, and cause serious damage to it. While steel grippers can be deformed, plastic grippers are easily broken, which implies that the latter have to be frequently replaced.

SUMMARY OF THE INVENTION

The problem at the heart of the present invention is thus to provide a gripper for containers which does not get damaged even when a container is suddenly pulled apart.

This problem is solved by a gripper for systems for manipulating containers such as outlined in the annexed claims.

Further features and advantages of the gripper being the object of the present invention will be better understood from the description of a preferred embodiment, which is given below by way of a non-limiting illustration.

DETAILED DESCRIPTION OF THE INVENTION

With reference to the figures, the gripper being the object of the present invention, which is generally designated with 1, comprises a support 2 on which cam means 3 and first 4 and second 5 jaws of the gripper are mounted.

Figure 4:
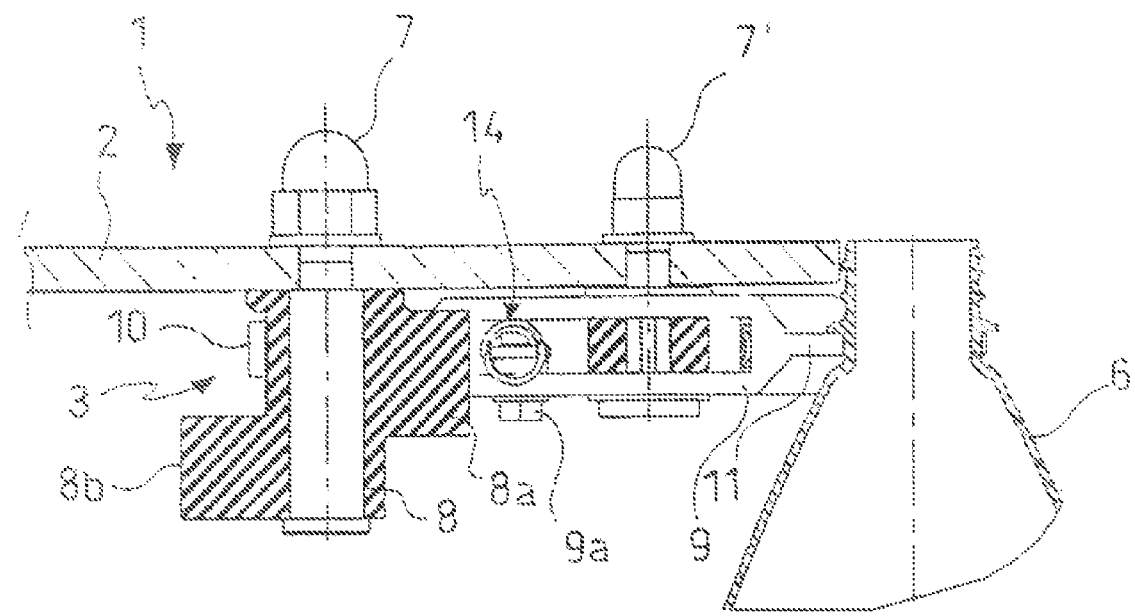
FIG. 4 is a view according to the section IV-IV in FIG. 1.
Figure 5:
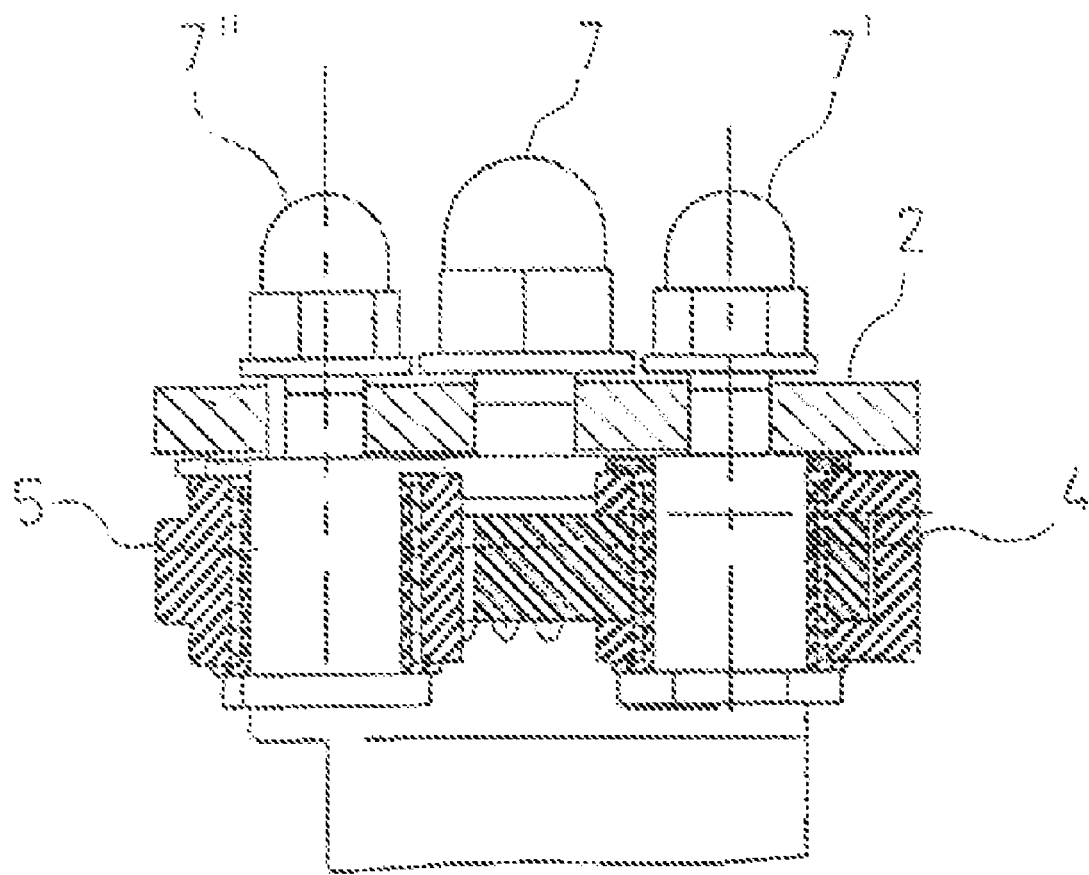
FIG. 5 is a view according to the section V-V in FIG. 1.

As may be seen in FIGS. 4 and 5, the support 2 is plate-like and fixed to the moving system (not shown) of the containers 6. Both the cam means 3 and the jaws 4, 5 are pivotally hinged to the support 2 by means of suitable hinge means 7, 7', 7", such as to hang from said support 2.

The cam means 3 are of a conventional type, such as a disk cam 8 comprising a first reactive profile 8a intended to interact with the driven organ of the gripper and a second reactive profile 8b intended to interact with suitable guide means arranged in a preset fixed position on the equipment, such as to control the opening and closure of the gripper 1 where desired.

The first jaw 4, hereinafter referred to as the guided jaw 4, is a rocker arm driven organ for the cam means 3. The driven jaw 4 comprises a body 9 that is hinged to said support 2 via the hinge means 7' described above, a guide finger 10 and a hook 11.

The guide finger 10 is intended to interact with the cam means 3 and in all the operating steps of the gripper 1 it remains in contact with the first reactive profile 8a of the cam.

The hook 11 is intended to interact with the neck of the container 6, normally below the stop ring for the container closure, and comprises to the purpose a gripping profile 11a which is shaped such as to ensure, together with the matching hook of the second jaw 5, the best grip on the neck of the container 6. In substance, said gripping profile 11a is substantially semicircular and comprises a central depressed portion 12 and a peripheral portion 13 in relief, which are joined to each other in a stepped manner.

Figure 2:
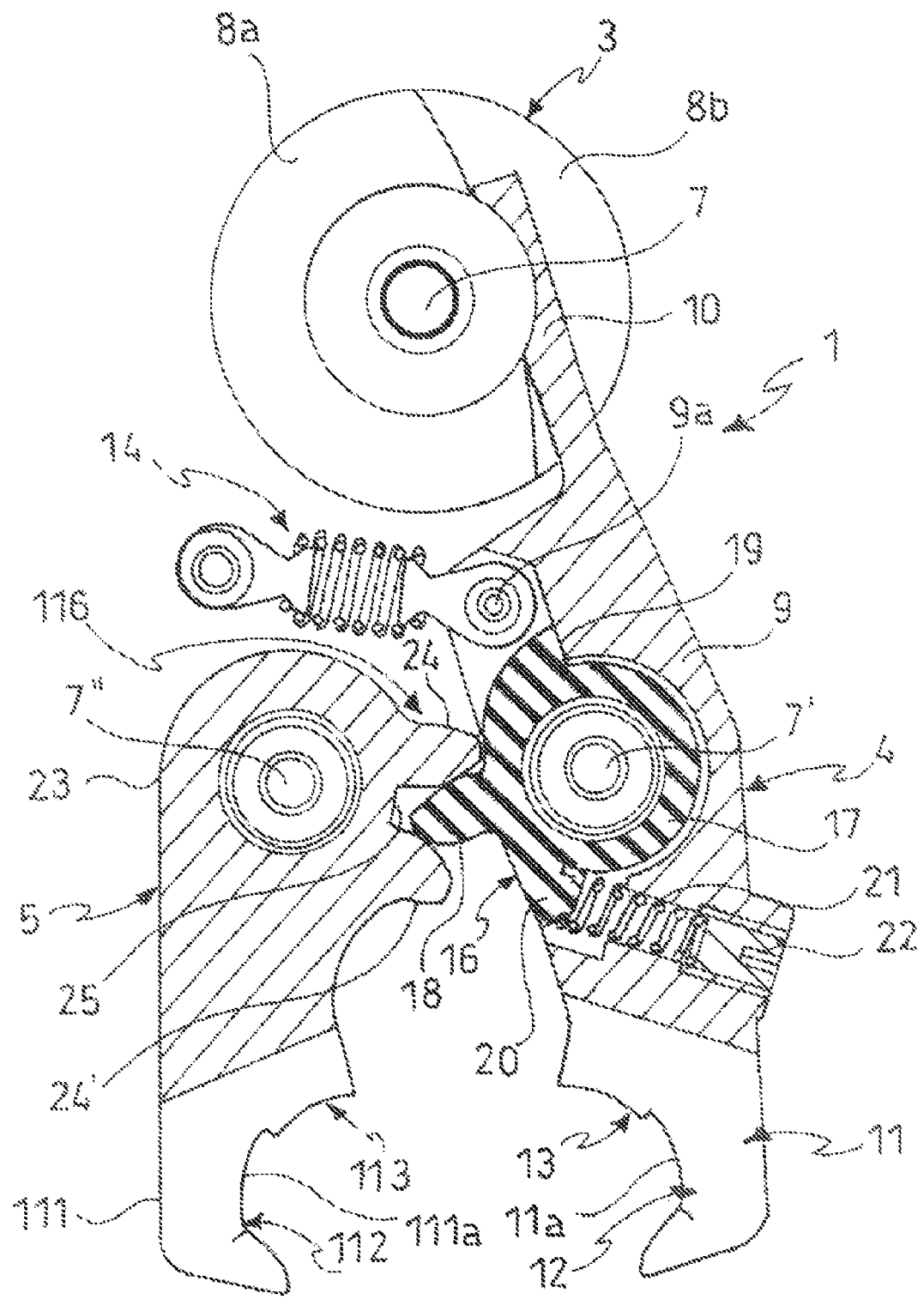
FIG. 2 is a plan view of the gripper in FIG. 1 in the opened condition.

Elastic means 14 are hinged to the body 9 of the guided jaw 4, on the portion proximate to the guide finger 10, by means of hinge means 9a. At the opposite end, the elastic means 14 are directly hinged to the support 2 by means of hinge means 15. These elastic means 14 are preloaded such that they tend to recall the guided jaw 4 in an open condition, such as shown in FIG. 2. The closure of the gripper 1 will thus take place against the resistance of the elastic means 14 by the action of the cam means 3 on the guide finger 10 of the guided jaw 4.

The body 9 of the guided jaw 4 further comprises actuating means 16 that, in cooperation with the second jaw 5, provide to open/close the gripper 1. These actuating means 16 comprise a body 17 that is, in turn, pivotally hinged to the hinge means 7', from which an actuating tooth 18 projects in the direction substantially perpendicular to the axis of the guided jaw 4.

The body 17 of the actuating means 16 is housed in a cavity having a substantially complementary shape which is purposely formed in the body 9 of the guided jaw 4. Said body 17 has a substantially circular plan section that is interrupted by a step forming a pawl 19, which abuts against an abutment surface 19a of the body 9 and prevents the actuating means 16 from rotating clockwise, while counter-clockwise rotation is allowed. The body 17 further has a relief 20 on which the elastic means 21 act upon. At the opposite end thereof, the elastic means 21 act on a stop element 22 being formed in the body 9 of the guided jaw 4 and are preloaded such as to hold the pawl 19 pressed against the abutment surface 19a.

The second jaw 5, which is pivotally hinged to the hinge means 7", as said above, has a body 23 and a hook 111 that is entirely similar to the hook 11 of the guided jaw 4, thereby the elements 112, 111a and 113 correspond to the elements 12, 11a and 13 of the guided jaw 4.

The second jaw 5 further comprises receiving means 116 for the actuating means 16 of the guided jaw 4. Practically, from the body 23 of the second jaw 5 there projects a pair of teeth 24, 24' which are separated by a concavity 25 that forms a seat for the actuating tooth 18 of the guided jaw 4.

The operation of the inventive gripper will be now described.

Figure 1:
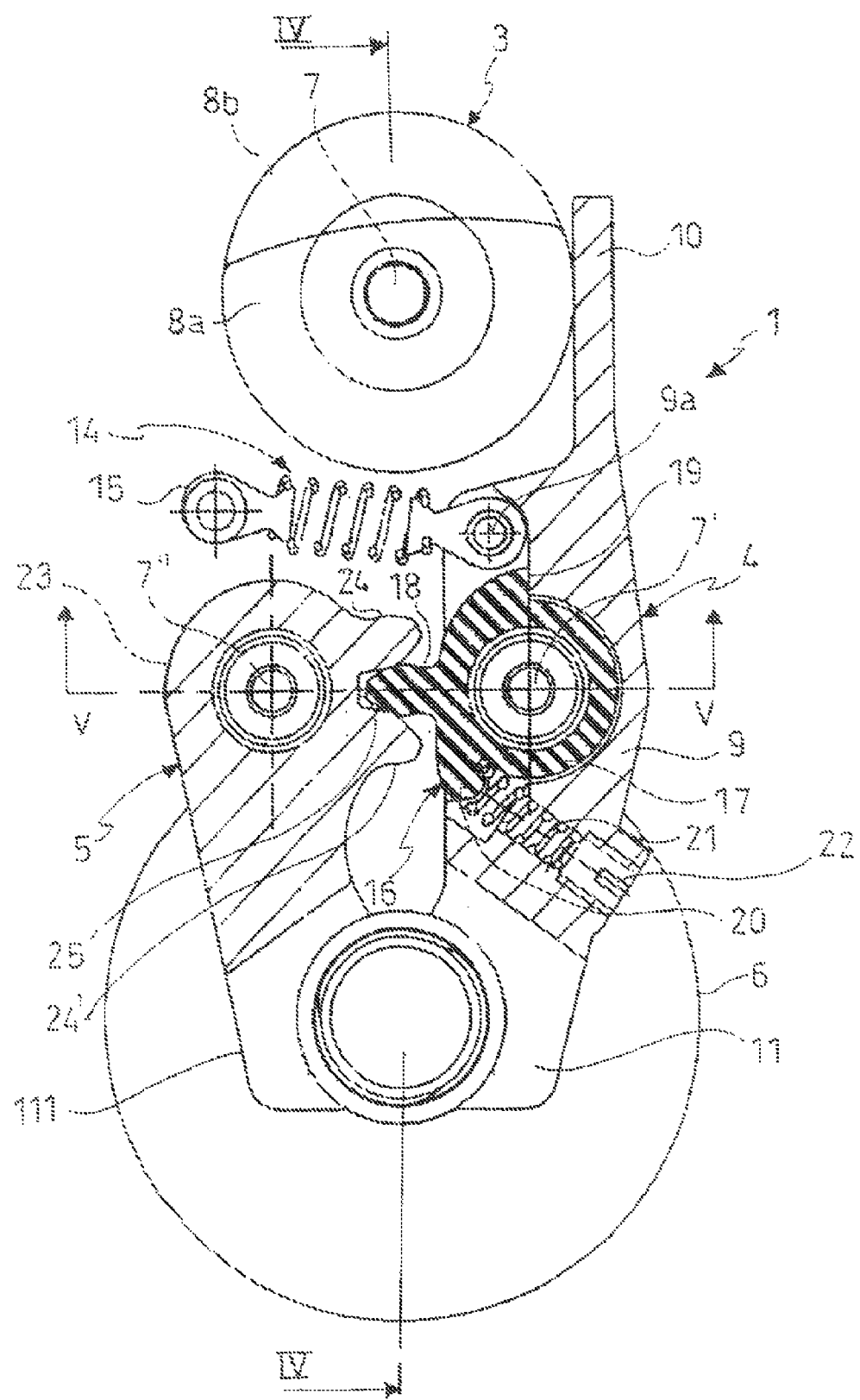
FIG. 1 is a sectional plan view of the inventive gripper as being closed on a bottle.

Upon a non operating condition, the gripper 1 is as shown in FIG. 2, with the jaws 4, 5 being opened. When the first reactive profile 8a of the cam 8 acts on the guide finger 10, the guided jaw 4 is driven to rotate clockwise against the resistance of the elastic means 14. The actuating tooth 18 will thus act against the walls of the teeth 24, 24' of the second jaw 5, thus causing a counter-clockwise rotation of the same about the hinge means 7". The rotation of the two jaws 4, 5 causes the same to be closed around the neck of a container 6, as shown in FIG. 1. The actuating tooth 18 will integrally move with the guided jaw 4, due to the fact that the elastic means 21 are suitably preloaded and thus counteract the thrust reaction to which the actuating means 16 are subjected and which would tend to cause them to rotate counter-clockwise.

Upon the subsequent opening of the gripper 1, i.e. when the first reactive profile 8*a* of the cam 8 moves back to the position in FIG. 2, the actuating tooth 18 will move again integrally with the guided jaw 4 due to the pawl 19 that prevents the actuating means 16 from rotating clockwise.

Figure 3:
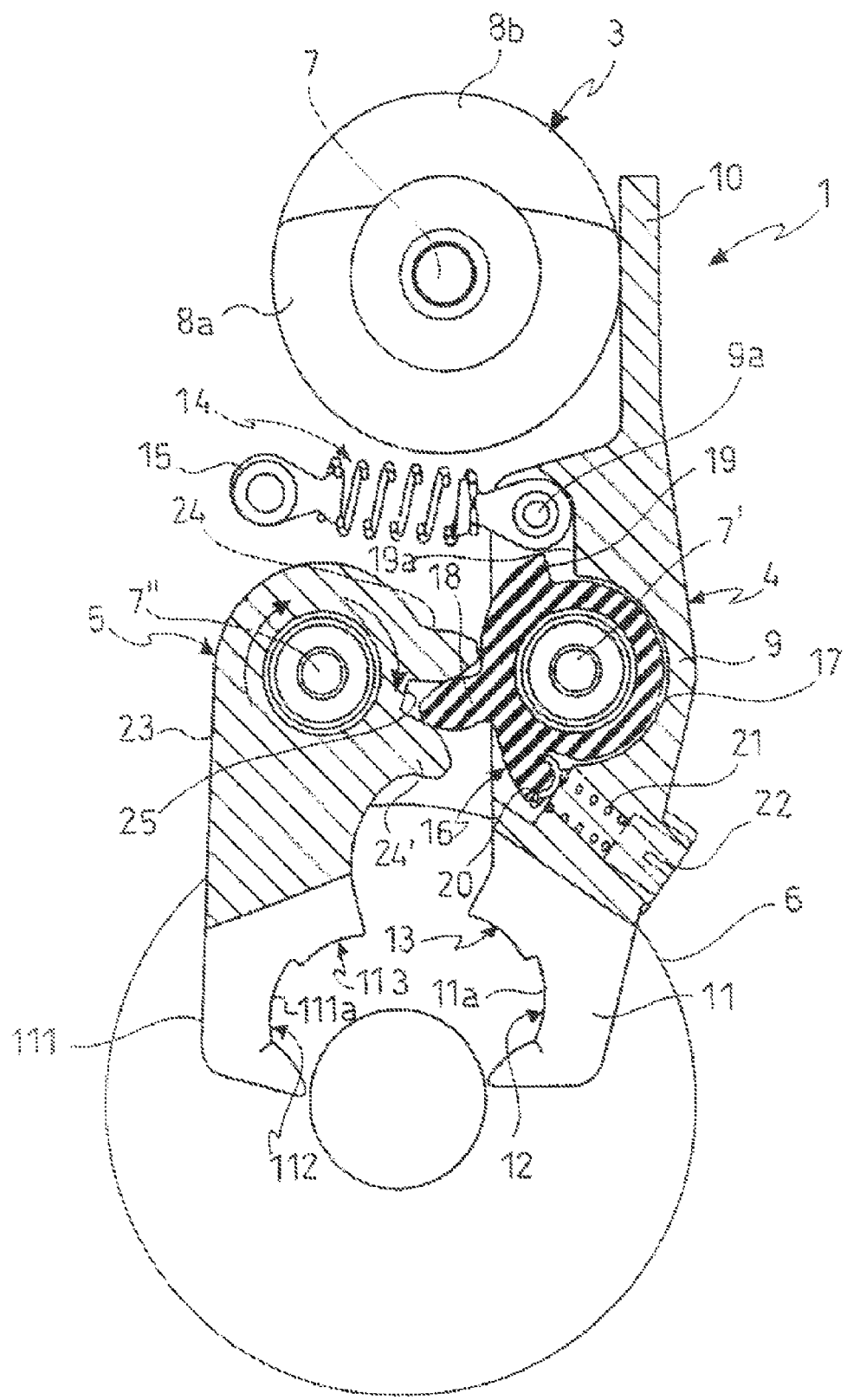
FIG. 3 is a sectional plan view of the gripper in FIG. 1 in a step of pulling apart the container.

When the anomalous situation occurs as shown in FIG. 3 (e.g., when the container 6 gets entangled in a fixed part of the machine), the container 6 acts as a lever on the second jaw 5, which thus rotates clockwise, thereby the teeth 24, 24' act on the actuating tooth 18 such that it is forced to rotate counter-clockwise. As the actuating tooth 18 is integral with the actuating means 16 and these are free to rotate counter-clockwise against the resistance of the elastic means 21, when the preload force of the elastic means is overcome, the gripper 1 opens as much as to allow the container 6 to be released without causing any damage to the gripper. On the contrary, when the actuating tooth 18 is integral with the guided jaw 5 as in the prior art grippers, the gripper will be broken or at least damaged.

The advantages of the gripper 1 according to the invention are thus apparent. The fact that the gripper is prevented from being damaged or broken by means of the inventive device not only means that the cost for spare parts has been decreased, but also and above all, that the number of interruptions of the plant operation for allowing the replacement of the damaged piece is dramatically reduced, which results in the optimization of the manufacturing cycle.

It will be appreciated that only a particular embodiment of the gripper for container handling systems being the object of the present invention has been described herein, to which those skilled in the art will be able to make any and all modifications necessary for its adjustment to specific applications, without however departing from the scope of protection of the present invention as defined in the annexed claims.

What we claim is:

1. A gripper (1) for systems for manipulating containers (6), said gripper comprising a support (2) to which cam means (3) are pivotally hinged,
   a first jaw (4) pivotally mounted on the support by a first hinge means, said first jaw being engaged by said cam means (3) and
   a second jaw (5) pivotally mounted on the support by a second hinge means, said second jaw being controlled by actuating means (16) pivotally mounted on said first jaw and interacting with receiving means (116) that are integral with said second jaw (5) for either opening or closing said gripper (1), wherein
   said actuating means (16) being spring biased with respect to said first jaw (4) such that, when the jaws are forced apart, said actuating means (16) can rotate relative to said first jaw (4) thus allowing said gripper (1) to at least partially open,
   wherein said actuating means (16) comprise a body (17) from which there projects an actuating tooth (18) and wherein said receiving means (116) comprise a pair of teeth (24, 24') integral with said second jaw (5), said actuating tooth (18) being fitted therebetween and interacting therewith.

2. The gripper (1) according to claim 1, wherein said body (17) of the actuating means (16) is housed in a cavity having a substantially complementary shape, which is formed in said first jaw (4), said body (17) comprising a pawl (19) intended to abut against an abutment surface (19*a*) of said first jaw (4) for preventing the rotation of said actuating means (16) in a rotational direction, while allowing the same to rotate in the opposite direction.

3. The gripper (1) according to claim 1, wherein said actuating means (16) comprise a relief (20) and elastic means (21) acting on said relief (20) and on a stop element (22) being associated with said first jaw (4).

4. The gripper (1) according to claim 3, wherein said elastic means (21) are preloaded such that the pawl (19) is hold pressed against the abutment surface (19*a*).

5. The gripper (1) according to claim 1, wherein between said first jaw (4) and said support (2) there are hinged elastic means (14), said elastic means (14) being preloaded such that they tend to recall said first jaw (4) in an opened condition.

6. The gripper (1) according to claim 1, wherein said first and second jaws (4, 5) comprise respective hooks (11, 111) being intended to interact with the neck of the container (6), which have a gripping profile (11*a*, 111*a*) for the neck of said container (6).

7. The gripper (1) according to claim 6, wherein said gripping profile (1 la, 11 la) is substantially semicircular and comprises a central depressed portion (12, 112) and a peripheral portion (13, 113) in relief, which are joined to each other in a stepped manner.

8. The gripper (1) according to claim 1, wherein said first jaw (4) comprises a guide finger (10) that is intended to interact with a reactive profile (8*a*) of said cam means (3).

9. A gripper for manipulating containers, said gripper comprising a support, a first jaw pivotally mounted on the support by a first hinge, a second jaw pivotally mounted on the support by a second hinge, and
   a cam for moving said first jaw between an open position and a closed position,
   a safety actuator pivotally mounted on said first jaw and interacting with structure on said second jaw to pivot the second jaw,
   said safety actuator being biased by a spring toward a normal position in which the actuator moves the jaws in unison toward and away from one another, but being able to pivot away from said normal position against the spring's bias to a safe position when an obstruction is encountered, to avoid damage to the jaws or to the obstruction,
   wherein the structure on the second jaw is at least one gear tooth and the safety actuator has at least one gear tooth for engaging the tooth on the second jaw.

\* \* \* \* \*